July 10, 1928.
C. N. KISECKER
1,676,393
HEADLIGHT
Filed Jan. 6, 1927
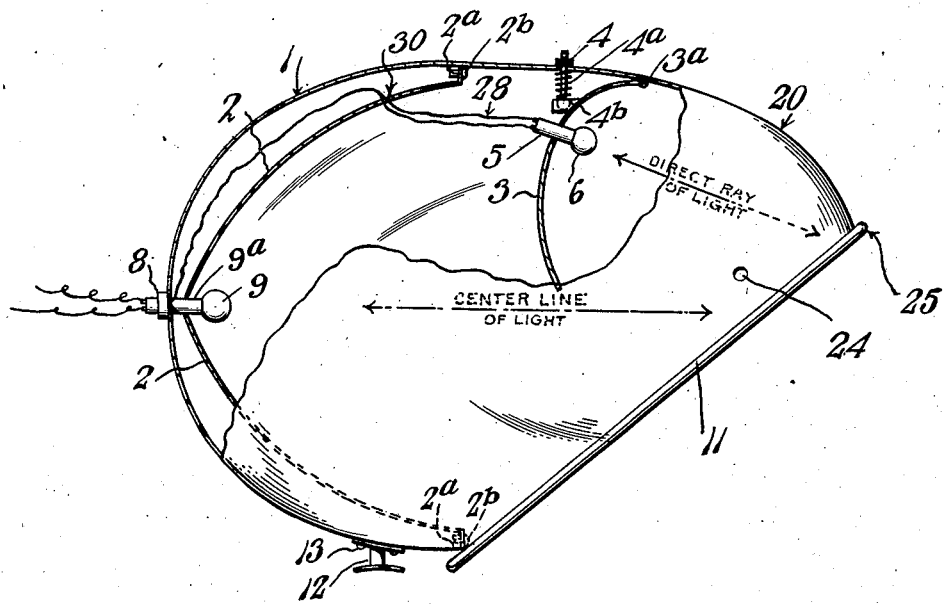
Inventor:
Charles N. Kisecker
by
E. W. P. Evans Atty.

Patented July 10, 1928.

1,676,393

UNITED STATES PATENT OFFICE.

CHARLES N. KISECKER, OF DAYTON, OHIO.

HEADLIGHT.

Application filed January 6, 1927. Serial No. 159,333.

My invention relates to improvements in headlights for automobiles and like vehicles, and it consists in the combinations, constructions and arrangements of parts herein described and claimed.

One object of my invention is to provide a headlight in which two sources of light and two reflecting surfaces are used, so located that they will project a non-glare light upon different portions of the road ahead of the automobile or vehicle upon which mounted.

Another object of my invention is to provide a headlight which gives the driver a clear vision of the ground or road ahead without in any manner interfering with the vision of the driver of an approaching automobile or vehicle.

A further object of my improved headlight is to provide an adjustable reflector within the headlight so that the rays of light can be focused anywhere from 15 to 60 feet immediately in front of the automobile or vehicle to which the headlight is attached.

A further object of my invention is to so construct the top curved front portion of the casing of the headlight that it extends downwardly to a point slightly above the center of the direct rays of light, and the lower portion of the casing is under cut to an angle of 45 degrees, more or less, thus throwing the rays of light close to the ground where fog is not so dense, eliminating all possibility of blinding glare, and also prevents the blinding glare through the rear window of a preceding automobile or other vehicle.

Other objects and advantages will appear in the following specification. The invention resides in the combination and arrangement of parts and in the details of construction hereinafter described and claimed, it being understood, however, that changes in the precise embodiment, shape, or size of the headlight or parts thereof herein disclosed may be made without departing from the spirit of the invention.

My invention is illustrated in the accompanying drawing forming part of this application, in which—

The figure is a sectional view of a preferred form of the headlight partially in elevation.

In constructing my headlight I make use of a helmet shaped casing or shell 1. The upper front half of casing 1 at 20 extends with a cone shaped curve forward and downwardly to a point slightly above the center or horizontal line of a direct ray of light from main light bulb 9. The lower front half of my headlight casing 1 is cut away to provide for the fitting of lens 11, held in place by the usual ring or clamp 25. Electric light bulb 9 is mounted in an adjustable socket placed at the rear of casing 1, and passed through an opening therein and held in position by the usual attachment 8.

A reflector 2 of the usual type is provided being held in position by nuts $2^a$ and set screws $2^b$, the nuts $2^a$ being securely attached to casing 1. Just forward of the center of upper portion of casing 1, is attached another reflector 3, movably affixed to inner top of casing 1 at $3^a$. Through this reflector 3 is passed usual light socket 5. A ball and socket connection $4^b$ is also attached to rear of reflector 3. An adjusting screw 4 is passed through a hole provided in casing 1 and connected with ball and socket $4^b$ as shown by which means reflector 3 can be adjusted to any desired position. A spring $4^a$ is provided around screw 4 to hold reflector 3 in proper position. It will be observed that by means of adjusting screw 4, reflector 3 controls the angle of light 6, which thus in effect becomes a spot light, which can be adjusted so that the direct rays of light therefrom can be focused anywhere from 15 to 60 feet in front of the automobile or other vehicle to which attached. It may be noticed here that direct light from bulb 9 is projected through more than three-fourths of lens 11. And also that direct light from bulb 6 is projected through upper portion of lens 11. Lower electric light 9, however, is used preferably continuously whereas upper light 6 is used as a spot light or continuously as desired. This feature is especially desirable for use in those States which have laws against the use of separated spot lights due to the glare from them. Light bulb 6 is enclosed and hidden within casing 1. A glass insert or button 24 is constructed in the side of front portion of casing 1. This button light may be red, green, or yellow as desired and serves as a warning to other parties coming from side streets or roads. Button 24 is illuminated by either or both light bulbs 6 and 9 and adds a finish of distinction to the headlight casing. At the bottom of casing 1 is affixed the usual flanged mounting device 12 attached by means of rivets 13 and provided with means for attachment to an appropriate part of the automobile or other vehicle.

It is understood that any appropriate type of lens for properly distributing light may be used as no claim to invention is made in connection with the type of lenses affixed. The invention resides in the novel combination of the special parts used and peculiar location, source and distribution of the light from both bulbs 6 and 9, both direct and reflected light, as hereinbefore described.

From the foregoing description of the mechanical parts and arrangement thereof, the operation of the headlight may be readily understood, but it is seen that substantially all of the light from both bulbs 6 and 9, is utilized without the possibility of confusing an approaching driver or persons crossing in front of the automobile or other vehicle to which it is attached. It will also be noticed that by these arrangements of lights and constructions, no light is projected high enough to enter the rear window of a preceding automobile. The light from each bulb cooperates to furnish light through every opening, that is, through lens 11, through upper lens 10, and through buttons 24, whenever either or both are lighted. It is well to note that ordinary headlights focused at a distance in front of an automobile must be dimmed upon the approach of another vehicle, but with my construction and arrangement either or both bulbs may be kept in continuous illumination if desired, without any blinding effect, thus saving the driver from continually turning on and off the spot light or dimming at all.

To those skilled in the art of manufacturing headlights it will be evident that various changes may be made in this headlight without departing from the spirit of the invention, the true scope of which is shown in the appended claims.

Having thus fully described my invention, what I claim as new and desire to secure by Letters Patent is:—

1. A headlight comprising a helmet-shaped casing with an oval opening in front portion thereof, a reflector within said casing, a second reflector movably mounted to inner top of said casing, adjustable means for focusing said second reflector affixed to the rear thereof, two sources of light one within each reflector, said second reflector and casing confining the projected and reflected rays of light from said lights and reflectors to a predetermined area, a lens disposed at an angle of approximately 45 degrees over said oval opening, the upper source of light being hidden from view by front curved portion of said casing.

2. In combination a headlight consisting of a helmet-shaped casing with an oval opening in forward portion thereof, a lens placed at an angle of approximately 45 degrees over said oval opening, means for holding said lens in place, a main light, a main reflector in the rear of said casing, another reflector movably attached to upper inner section of said casing, a light bulb and socket therefor affixed to said reflector, set screw means passing through said casing, a spring around said set screw means within said casing, said set crew means being attached to a ball and socket connection affixed at rear of said second reflector capable of adjusting said reflector to any angle desired to deflect light through upper part of said lens.

3. A headlight comprising a helmet-shaped casing having an oval opening in the forward portion thereof, a lower reflector within said casing, a second reflector within said casing movably mounted to inner upper portion of said casing, adjustable means for focusing said second reflector affixed to rear thereof, two sources of light one in each reflector, the upper source of light being hidden from view by front curved portion of said casing, said curved portion extending forward and downwardly to a point on a line approximately midway between center and top of casing, and a lens affixed over said oval opening.

4. In combination a headlight comprising a helmet shaped casing provided with an opening in front portion thereof, a lens placed over said opening at an angle of approximately 45 degrees, ring means for holding said lens thereon, a lower reflector within said casing, a second reflector movably mounted to inner upper section of said casing, adjustable means extending through said casing for focusing said second reflector and affixed to the rear thereof, two sources of light, one mounted in each reflector, and two small openings, one on each side of front portion of said casing for the insertion of a colored glass button, said small openings being placed so that they will receive direct rays of light from either of said sources of light, as well as reflected light therefrom.

In witness whereof I have hereunto affixed my signature.

C. N. KISECKER.